(12) United States Patent
Kenyon et al.

(10) Patent No.: US 6,697,530 B2
(45) Date of Patent: Feb. 24, 2004

(54) DATA COMPRESSION THROUGH ADAPTIVE DATA SIZE REDUCTION

(75) Inventors: Jeremy A. Kenyon, Kirkland, WA (US); Peter D. Smith, Redmond, WA (US)

(73) Assignee: WildTangent, Inc., Redmond, WA (US)

(*) Notice: Subject to any disclaimer, the term of this patent is extended or adjusted under 35 U.S.C. 154(b) by 0 days.

(21) Appl. No.: 10/087,099

(22) Filed: Mar. 1, 2002

(65) Prior Publication Data

US 2002/0090141 A1 Jul. 11, 2002

Related U.S. Application Data

(63) Continuation of application No. 09/399,062, filed on Sep. 18, 1999, now Pat. No. 6,577,769.

(51) Int. Cl.[7] ................................................. G06K 9/36
(52) U.S. Cl. ........................ 382/239; 382/232; 382/241
(58) Field of Search ................................. 382/232, 174, 382/289, 239, 161, 228, 241; 707/6, 2, 3; 345/421, 419

(56) References Cited

U.S. PATENT DOCUMENTS

| | | | |
|---|---|---|---|
| 3,656,178 A | 4/1972 | De Maine et al. ............ | 341/87 |
| 5,155,772 A | 10/1992 | Brandman et al. ........... | 704/203 |
| 5,367,620 A | 11/1994 | Ito et al. ..................... | 345/467 |
| 5,388,209 A | 2/1995 | Akagiri ....................... | 704/229 |
| 5,552,898 A | 9/1996 | Deschuytere ................ | 382/244 |
| 5,583,977 A | 12/1996 | Seidl .......................... | 345/619 |
| 5,638,498 A | 6/1997 | Tyler et al. .................. | 358/1.18 |
| 5,710,916 A | 1/1998 | Barbara et al. ................ | 707/9 |
| 5,740,409 A | 4/1998 | Deering ....................... | 345/503 |
| 5,751,809 A | 5/1998 | Davis et al. ................. | 713/176 |
| 5,790,979 A | 8/1998 | Liedtke ....................... | 711/206 |
| 5,793,371 A | 8/1998 | Deering ....................... | 345/418 |

(List continued on next page.)

OTHER PUBLICATIONS

Zhuang et al., "Simplifying Complex CAD Geometry with Conservative Bounding Contours", IEEE International Conference on Robotics and Automation, vol. 3, Apr. 1997, pps. 2503–2508.*

Naphatali Rishe, "Interval–based approach to lexicographic representation and compression of numeric data", Data and Knowledge Engineering, 8, 4(1992), pp. 339–351.

Searfoss, G. "Bounding Box Data Compression", Dr. Bob's Journal of Software Tools, Apr. 1990, USA, vol. 15, No. 4, pp. 56–64, 108, XP000981336 ISSN: 1044–789X p. 58, paragraph 1—paragraph 10.

Deering, M. "Geometry Compression" Computer Graphics Proceedings (Siggraph), US, New York, IEEE, Aug. 6, 1995, pp. 13–20, XP000546211, ISBN: 0–89791–701–4 p. 15, left–hand column, paragraph 7—right hand column, paragraph 3.

*Primary Examiner*—Anh Hong Do
(74) *Attorney, Agent, or Firm*—Schwabe, Williamson & Wyatt, P.C.

(57) ABSTRACT

A computing-device implemented method for compressing data, where such devices include a computer, personal digital assistant (PDA), home appliance, and the like. The data includes bandwidth intensive information such as that used in video conferencing, MPEG and equivalent types of digital video encoding, multi-media data transfers, and interactive gaming. In one implementation, a 3D model has objects defined therein. Each object is defined according to a data collection, each element within the collection having a first data size. A distance is determined between a reference point in the model, and a bounding box for an object. A data reduction factor is selected based, at least in part, on the distance. The data collection is compressed according to the distance by mapping each data of the first data size to data having a second data size smaller than the first data size. Other compression methods and apparatus are disclosed.

16 Claims, 8 Drawing Sheets

U.S. PATENT DOCUMENTS

| | | | |
|---|---|---|---|
| 5,852,710 A | 12/1998 | Shiohara et al. | 358/1.16 |
| 5,867,167 A | 2/1999 | Deering | 345/419 |
| 5,870,094 A | 2/1999 | Deering | 345/419 |
| 5,930,813 A | 7/1999 | Padgett et al. | 707/539 |
| 5,977,979 A | 11/1999 | Clough et al. | 345/422 |
| 6,023,279 A * | 2/2000 | Sowizral et al. | 345/421 |
| 6,169,819 B1 * | 1/2001 | Dyer et al. | 382/232 |
| 6,246,422 B1 | 6/2001 | Emberling et al. | 345/552 |
| 6,249,604 B1 | 6/2001 | Huttenlocher et al. | 382/174 |
| 6,282,540 B1 * | 8/2001 | Goldensher et al. | 70/6 |
| 6,304,940 B1 | 10/2001 | Beardsley | 711/112 |
| 6,313,838 B1 | 11/2001 | Deering | 345/420 |

* cited by examiner

DATA COMPRESSION THROUGH ADAPTIVE DATA SIZE REDUCTION

This is a continuation of U.S. patent application Ser. No. 09/399,062 filed on Sep. 18, 1999. Now U.S. Pat. No. 6,577,769.

FIELD OF THE INVENTION

The present invention generally relates to the fields of data compression, and more particularly, to compressing 3D multimedia transfers over a network connection.

BACKGROUND 3D multimedia includes video conferencing, interactive games, web-page content, audio/visual (A/V) recordings, to name but a few (hereafter collectively "A/V data"). A/V data requires significant storage space, as well as substantial bandwidth to transmit the data over a network. Since most data recipients do not have sufficient bandwidth to receive the A/V data in its original form, A/V data has traditionally been retrieved over a local high-speed bus or specialized high-speed data links.

For example, consider computerized games. Games include simple single-user simulators for pinball, cards, gambling, fighting, etc., or more complex multiple-player turn-taking games where each player competed against the game and ultimately compared scores. Well-known high-tech gaming systems include the Nintendo® and Sony PlayStation® gaming systems. These and other games use geometry to describe two and three-dimensional objects within gaming models. In particular, complex object surfaces are usually represented by a combination of one or more basic object shapes, such as splines, non-uniform rational splines (NURBs), texture maps, and (monohedral) triangle tesselation. Typically, an arbitrary object is defined by triangle tesselation, each triangle having associated spatial coordinate tuples X, Y (and perhaps Z), color, normal, and other attributes. This information, when multiplied by hundreds or thousands of polygons in moderately complex objects, amounts data that must be retrieved from dedicated graphics systems and local storage of graphics data. The data transfer requirements prohibit play against remote players. Although some games have been designed to use a modem to directly call a remote player and establish a game, this solution was often clumsy, slow, and inconsistent; rich content transfer was infeasible.

Or, consider video conferencing applications. As with games, these applications concern transferring large volumes of data. However, these applications must transfer the data to remote locations (e.g., conference participants). Therefore, they have required high-speed data links, e.g., at a minimum, a 128 K-bit bonded ISDN connection to the remote participant, or more preferably, a T1 or faster frame-relay connection. Unfortunately, these speedy connection backbones are not generally available to users, and require complex technical support to maintain an active link. Conferencing also shares the modem-game limitation of requiring direct user-to-user connections.

With the recent advent of ubiquitous low-cost Internet connections, it has become a relatively straightforward matter to form a network communication link between multiple remote participants. This has spurred interest in using these generally available links to transfer A/V data. Unfortunately, due to the cost and technical complexity of maintaining ISDN, Frame Relay, and other high-speed links, Internet connections are commonly relatively slow modem-based connections. Since modem connections only generally realize an average modem bit rate of 14–40 KBits per second, these connections are not able to transfer, in reasonable time, rich game content, conferencing data, or other A/V data. This problem is exacerbated with each additional remote participant, since A/V data must now be distributed to multiple recipients—further consuming bandwidth resources.

In an effort to reduce bandwidth constraints, and take advantage of the easily-available slow networking connections, there have been efforts to compress A/V data. For example, data and geometry compression has previously been used to reduce information content in 2D and 3D models. Previous compression attempts include image compression (e.g., JPEG), defining objects with shared features (e.g., shared edges), small texture maps for large areas, etc. Examples of some of these and other techniques can be found in U.S. Pat. No. 5,740,409 which teaches a 3D graphics accelerator for compressed geometry, and U.S. Pat. Nos. 5,793,371, 5,867,167, and 5,870,094 which teach various methods for more-efficiently encoding 3D models. These compression techniques are readily applicable to A/V game data (which use models), as well as other A/V data representing data in a compatible compressible format, such as Moving Picture Experts Group (MPEG) digital video encoding.

In addition to geometry compression, general purpose data compression procedures has also been applied to A/V data. Such techniques include Huffman encoding (See Huffman, "A Method For Construction Of Minimum Redundancy Codes", Proceedings IRE, 40, 10 pages 1098–1100 (September 1952)), Tunstall encoding (See Tunstall Doctoral thesis, "Synthesis of Noiseless Compression Codes", Georgia Institute of Technology (September 1967)), and Lempel-Ziv encoding (See "A Universal Algorithm For Sequential Data Compression", IEEE Transactions on Information Theory, IT-23, 3, pages 337–343 (May, 1977)), and run-length encoding of model data (see, e.g., U.S. Pat. No. 3,656,178). These general purpose compression techniques are applicable to all data formats.

Unfortunately, even after application of general purpose and geometric compression, there still remains a significant amount of information that needs to be transferred before games, conferencing, viewers of 3D multimedia, interactive 3D chat rooms, and other applications of A/V data appear to operate as if they are retrieving their data from local storage or high-speed links. Thus, some further data reduction is needed.

SUMMARY

A computing-device implemented method for compressing data, where such devices include a computer, personal digital assistant (PDA), home appliance, and the like. A distance is determined between a reference point in a model, and a bounding box for a model object defined according to a data collection, each element within the collection having a first data size. A data reduction factor is selected based, at least in part, on the distance. The data collection is compressed according to the distance by mapping each data of the first data size to data having a second data size smaller than the first data size. Other compression methods and apparatus are disclosed.

DETAILED DESCRIPTION

Although the present invention is applicable to a wide range of application programs, services, and devices which require transmitting rich content (such as A/V data) over a network, the following description focuses on delivering rich multimedia content from a gaming environment to players distributed over the network. The gaming paradigm has been chosen since it teaches delivery of A/V data as required for applications such as video conferencing, while also discussing the logistical complexity inherent in having multiple participants interactively affecting the delivery of A/V data.

Figure 1:
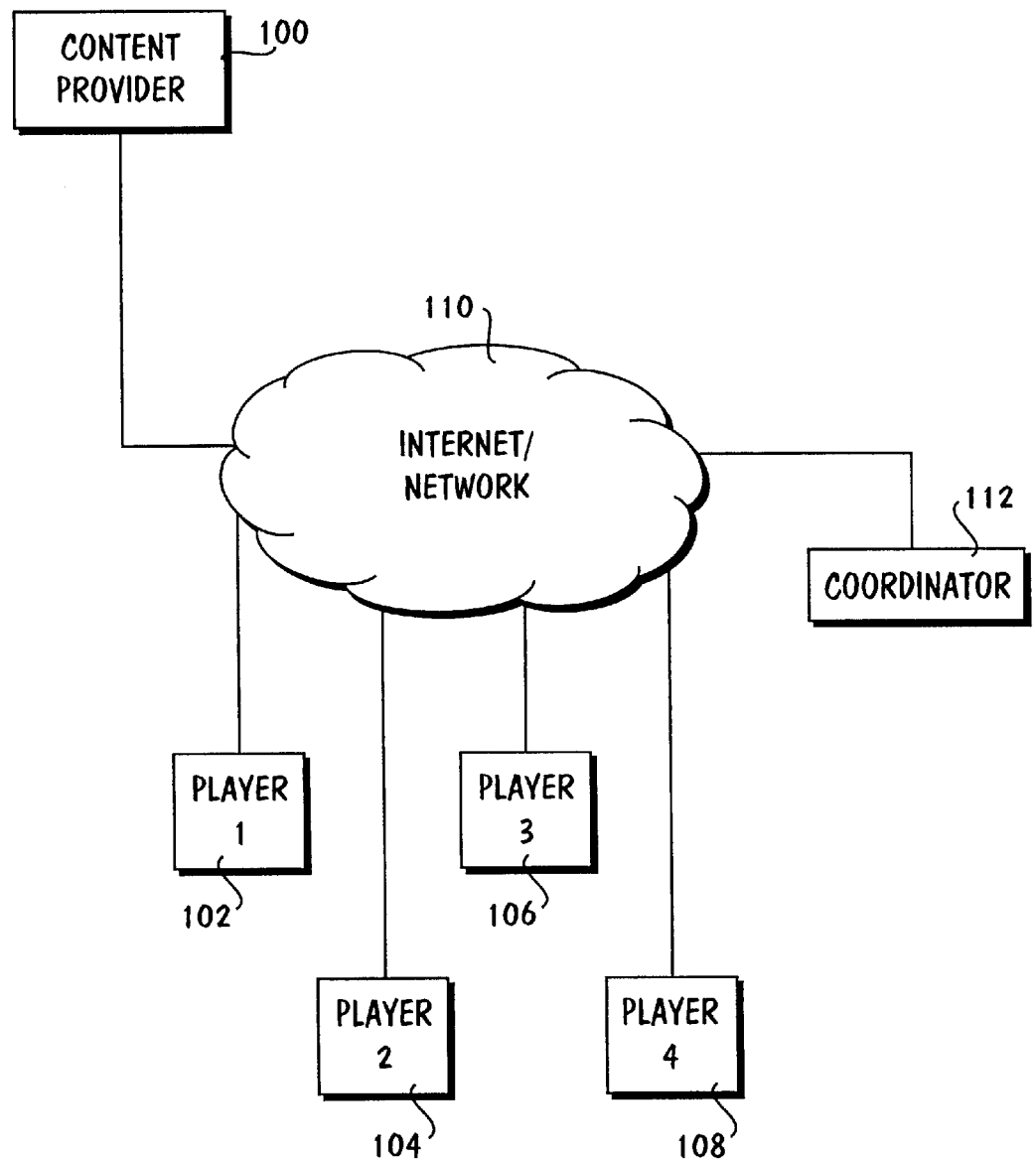
FIG. 1 illustrates a content provider in communication with several content recipients.

FIG. 1 illustrates a game content provider 100 in communication with several users/game players 102–108 over a publicly accessible network 110 such as the Internet. Also shown is a coordinator 112 that, as discussed below, may be coordinating gaming activity. For ease of understanding, it is assumed that the content provided is an interactive three-dimensional game (hence the users are designated as players). The game is assumed to incorporate a 3D model, where objects within the model have attributes such as position, color, texture, lighting, orientation, etc., and where the objects are ultimately defined by one or more triangles. However, as will be readily apparent from the description to follow, the present invention is applicable and may be practiced with all forms of multimedia content delivery.

As shown multiple players 102–108 are in communication with a content provider. In one embodiment, the players utilize an Internet browser as a playing device, where the browser has an installed plug-in (e.g., helper application) to aid in processing content transmitted by the provider. However, instead of a browser, other network application programs, such as dedicated gaming applications, can be used. For simplicity, it is assumed that the provider 100 acts as a central data distribution point for game data, transmitting all required data to each player 102–108. However, it is understood that gaming software can be configured so that players directly send each other information, or that one player or other network location may be used as a distribution point for other players (e.g., to distribute processing load).

Also shown is a game coordinator 112 that can be used as a central point for initiating or joining in to games in progress. Such a coordinator is useful in contexts such as the Internet, since players are routinely assigned random network addresses by their Internet Service Provider. Since a network connection between computers usually requires the computers to know each others' network address, a known coordinator can facilitate such connections by allowing players to contact the coordinator and publish their currently assigned network address. The coordinator can then redirect interested players to one or more content providers (e.g., 100). A coordinator may also be used to hide player identities from content providers, such as through network address hiding, or to coordinate player registration with different providers. Many corporations are now providing centralized "hubs" to facilitate game play; see, e.g., the MSN Gaming Zone (formerly the Internet Gaming zone) by Microsoft Corporation of Redmond Wash. at http://games.msn.com or http://www.microsoft.com/games.

Typically, when a player contacts a provider, the provider attempts to transmit game content to the player. If the player's browser is not yet configured to receive such content, this can trigger an automatic notification to the player to install the requisite plug-in, driver, or other data needed to play the provider's game.

Once a player has come into communication with a content provider, the provider must send game content to the player. As discussed above, various methods have been employed to reduce the amount of data that actually needs to be sent to such players. A significant amount of such data includes transmitting coordinate values for objects within a 3D model. It is advantageous to somehow further reduce the amount of space required for storing such coordinates.

Figure 2:
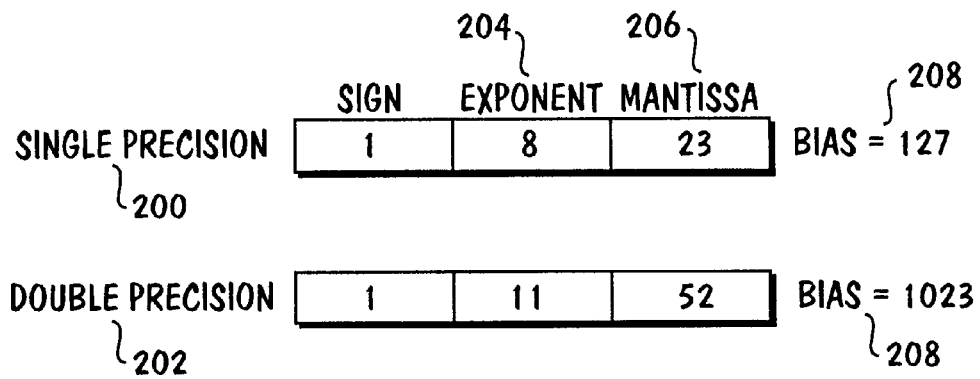
FIG. 2 illustrates an ANSI/IEEE 754-1985 floating point representation.
Figure 3:
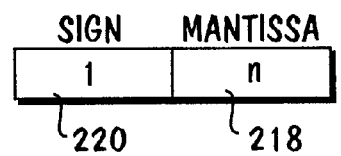
FIG. 3 illustrates an adaptively selected n-bit floating point arrangement.

FIG. 2 illustrates a typical floating point representation for single 200 and double 202 precision floating point numbers in accord with the ANSI/IEEE 754-1985 standard promulgated by the Institute for Electrical and Electronic Engineers (IEEE) and the American National Standards Institute (ANSI).

A 3D game model generally includes multiple objects, such as objects representing each player (e.g., a car or a ship), and objects for things present within the game environment (e.g., walls, trees, rocks, asteroids, scenery, background, etc.). Each object is typically defined by many triangles (e.g., hundreds or thousands), where each triangle has associated attributes such as spatial position, orientation, appearance, etc. The more realistic an object, the more triangles are needed to represent it. (Note that triangles are not strictly necessary to represent an object, however current rendering engines usually require all objects to be broken down into triangle format as such engines have hardware support for displaying triangles.)

Each triangle has a spatial location defined by 3 vertices. In a 3D model, each vertex is defined by X, Y, and Z coordinates identifying its location in the game's 3D space. Each vertex coordinate is stored as a floating point number, usually in the illustrated single-precision 32-bit IEEE-754 format 200. Thus, each of the hundreds or thousands of triangles in an object may require up to 96 bits to represent the triangle. Note that 96 bits is an upper bound due to reductions according to vertex sharing, e.g., two adjacent triangles only require 4 vertices, not 6. As discussed above, other geometry compression and data reduction techniques can also be applied.

As shown, each single precision format floating-point number has an 8 bit exponent 204 and a 24 bit mantissa 206 (significand). (Note that the mantissa has 24 bit precision which only requires 23 bits, since for all non-zero numbers a leading 1 bit can be implied.) The exponent is stored in biased (i.e., excess-n) form, where a bias 208 is subtracted from a stored number to obtain its actual value. Thus, even for a small object defined by only 100 vertices, this object requires 9,600 bits (32×100×3) to represent the positions of each of the vertices. And, given that a game typically includes many objects, and several players that need to receive such position information, a significant amount of data must be transferred simply to identify object positions.

Consequently, a more compact method for encoding floating point values would lessen this burden. When defining a particular floating point format, the general problem is performing a trade off between the size of the mantissa 206 and the size of the exponent 204. That is, choosing between numeric accuracy and numeric range. Increasing the size of the mantissa gives better accuracy; increasing the size of the exponent increases the range of the numbers that can be represented. This balance between accuracy and range can be applied to reduce the overall number of bits required to store coordinate values for objects within a 3D model. When accuracy is not needed, the bit lengths can be reduced.

Generally floating point numbers are in the format of $(-1)^{SignBit} \times \text{Mantissa} \times 2^{Exponent}$, where the mantissa corresponds to the fractional part of a real number, and the $2^{Exponent}$ shifts the decimal point appropriately. One method of reducing floating-point storage requirements is to unitize all object coordinates with respect to a local origin for the bounding box. By unitizing values, storing an exponent is unnecessary since it can be now implied by the bit precision of a mantissa 218. That is, if the mantissa encodes the value 12345678 (base 10), it is known a priori that the value encoded is really 0.12345678 or 1.2345678×10$^{-1}$. Implying the exponent represents an immediate 25% saving over traditional 32 bit formats. Note also that if all values are restricted to be positive, a further bit saving is possible by implying a sign bit 220 for positive values.

Figure 4:
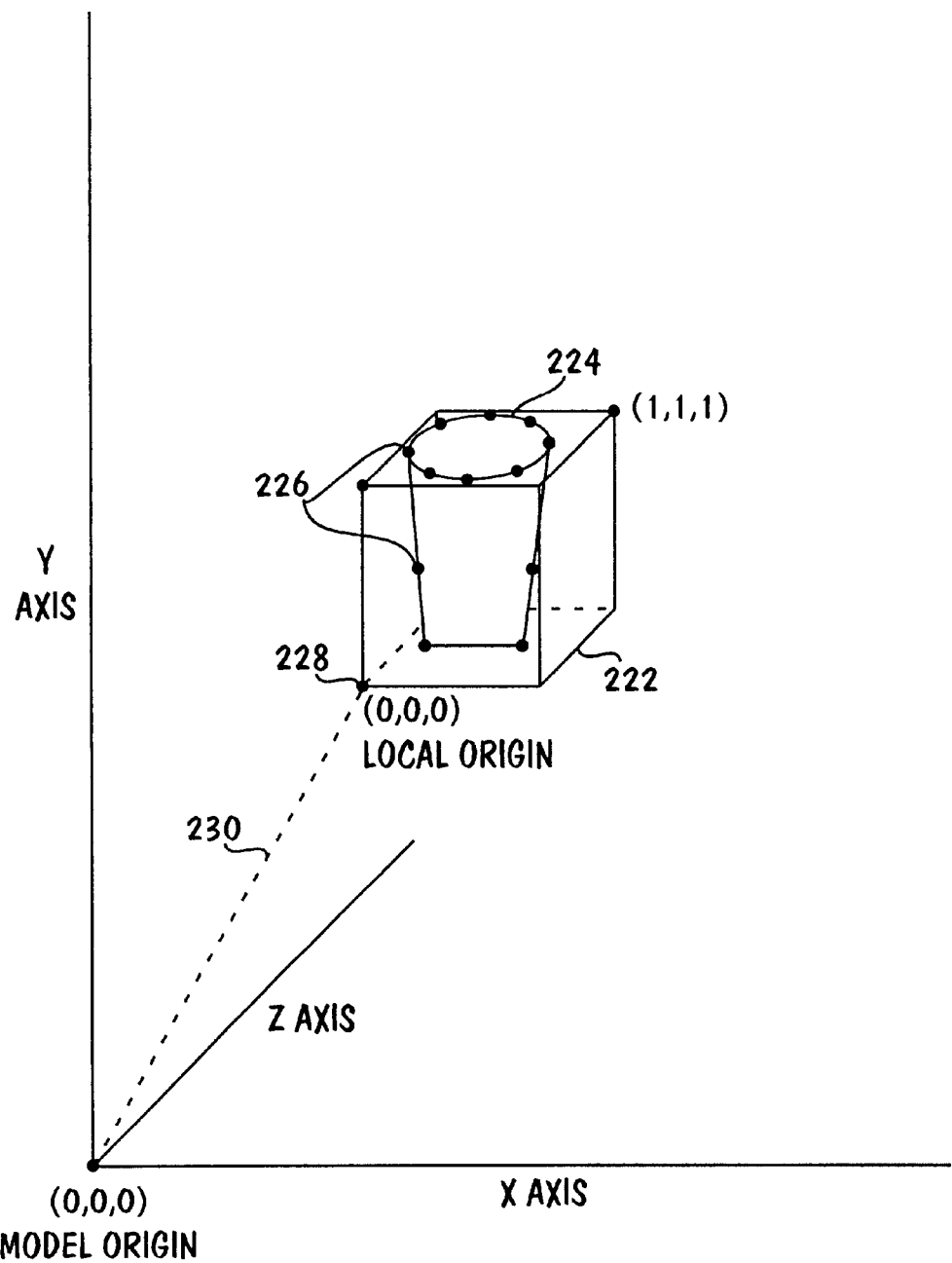
FIG. 4 illustrates floating-point precision reduction based on distance between a 3D model origin a local origin for an object.

As shown in FIG. 4, in addition to unitizing values, a further reduction in coordinate precision is available by defining a bounding box 222 for each object 224 within a model, and then converting object coordinates from the model's system and into unitized coordinates 226 with respect to a local origin 228 for the bounding box. By localizing values, the range of values is smaller, thus requiring less bit precision to represent the values. In addition, truncating coordinate precision of localized coordinate values has less a visual impact than if applied to object coordinates defined with respect to the 3D model itself. To maximize smallest-possible bit precision requirements, local unitized values are best defined with respect to the box's longest side.

For example, in one embodiment of the invention, suppose a model of size 10×10×10 is to be displayed, and that it includes a sub-model of size 2×2×2 at position 3×3×3. The sub-model includes, among other things, a vertex at position 3.21×3.21×3.21. Further, assume that the coordinate system is always normalized, and that exactly two digit precision is utilized. If the vertices of the sub-model are stored compared to the localized coordinates, then: the coordinates are restated with respect to the position of the sub-model: 3.21->0.21; the coordinates are scaled to the size of the sub-model; and, the coordinates are truncated to two significant digits. If the coordinates are unitized but not localized, then: the coordinates are not restated; the coordinates are scaled to the size of the model: 3.21->0.321; and, the coordinates are truncated to two significant figures: 0.321->32. Normally these operations are performed for each dimension of each vertex, however only one coordinate of one vertex has been discussed in this example.

In this embodiment, when compressed coordinates are restored, the operations are reversed. For localized coordinates: truncated figures are converted to a number, so 42->0.42; numbers are unscaled, so 0.42->0.21; and, coordinates are un-restated, so 0.21->3.21. For non-localized coordinates: truncated figureas are converted to a number, so 32->0.32; and, numbers are unscaled, so 0.32->3.2. (Note that the localized coordinates have remained the same, while the non-localized coordinates have moved slightly.)

Floating-point representations can be further compressed through specification of desired precision for stored values. That is, either through direct support by a model's developer, or through analysis of model data being sent to a player, floating-point values can be adaptively adjusted to suit expected use of a model's object. For example, a game developer can determine that, based on an object's predicted usage, n=6 bits is all that is required to encode an object's floating point values while still providing satisfactory visual performance. (Note that one can elect to keep an exponent component (e.g., not imply it), or choose to limit its precision in accord with the following discussion on limiting mantissa precision.) There are several conditions through which the need for precision can be determined by a model's developer, or automatically.

One such determination condition is when a designer, in designing a game, knows the expected uses for an object. In such cases, an object's representation can be tailored to reduce data space consumption. If, for example, it is known that a particular object represents background scenery that will always be "far away" from game players, then it is not necessary to maintain precise accuracy for feature coordinates. This is true because from a far distance, rendered object features will collapse and be indistinct. Therefore it is unnecessary to retain precise object feature data. (In fact, certain rendering systems will not even attempt to render object features when it is known that the feature would have a negligible impact on an output device (e.g., the screen).) In such circumstances, the precision available in a standard floating point value will be wasted, and a formula can be applied to truncate bit precision based on the theoretical distance of the object from viewers (e.g., players). The nature of the truncation formula depends on the distances involved.

Or, automatic truncation can be determined according to the offset 230 between bounding-box 222 origin and model origin (e.g., coordinate 0,0,0 for the model's 3D space). Distance-based precision reduction can also be determined according to distance between a viewing perspective and an object's bounding box 222. Thus, in a multi-user environment, each user will see different levels of detail according to their perspective on the model. The percentage of bit precision reduction can be computed as a linear reduction, stepwise grouping of distance ranges, or other formula. Distances can be compared against a maximum possible model (bounding) coordinate, a maximum-distanced object presently within the model, a maximum discernible distance (e.g., a distance beyond-which there is no effect on an output device), or some other criteria.

To recreate original model data, the offset 230 and distance-based scaling factor is tracked for the object 224, allowing its local coordinates to be converted back in to the model's coordinate system.

Figure 5:
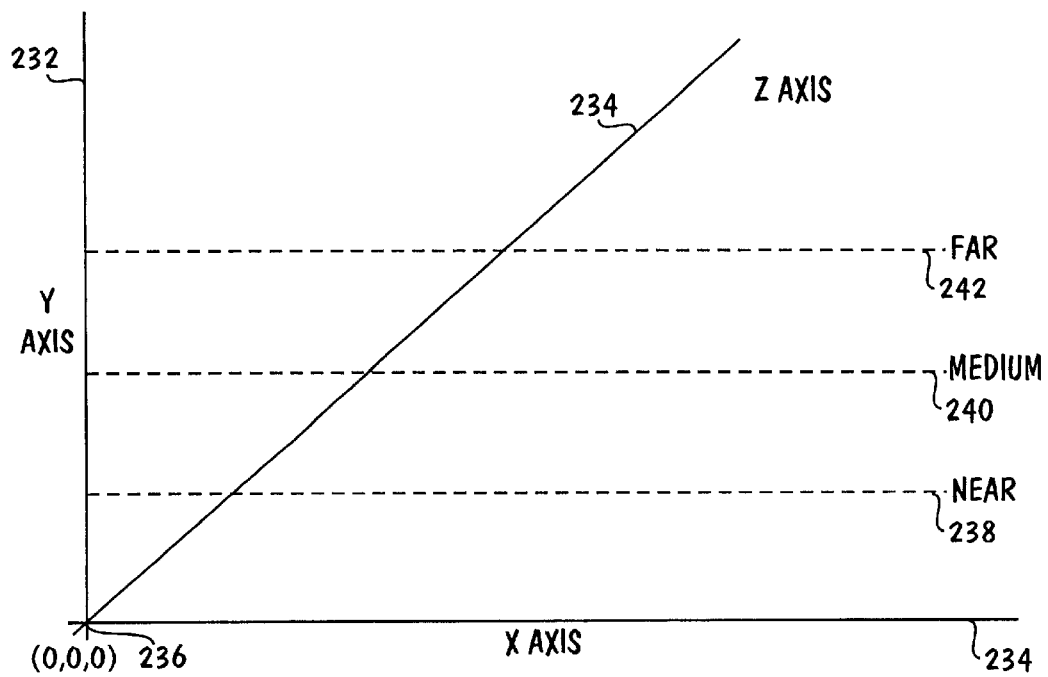
FIG. 5 illustrates depth-based precision.

FIG. 5 illustrates a coordinate system for a 3D model having X 234, Y 232 and Z 234 axes, where precision reduction is performed according to distance from a 3D model's origin 236. As illustrated, distances are roughly classified as being near 238, medium 240, and far 242. These distances correspond to respectively dividing (reducing) traditional floating point lengths into respective 20, 15 and 10-bit encodings. (Note that these encodings are arbitrary.)

Figure 6:
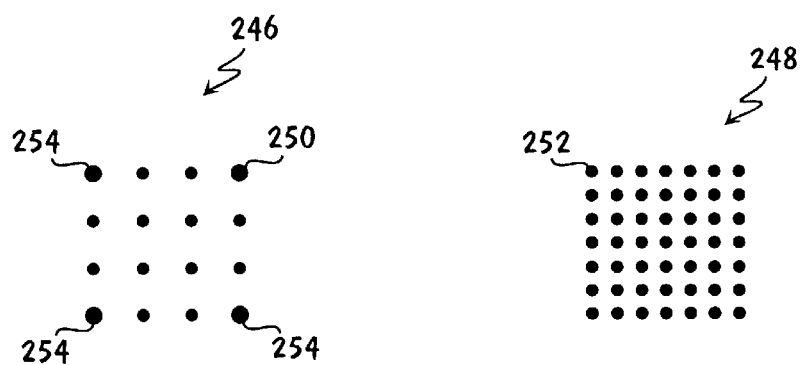
FIG. 6 illustrates vertex-density based precision.

FIG. 6 illustrates determining floating-point precision based on an object's coordinate density. That is, precision is made proportional to the spacing between an object's vertices. If an object is defined with widely spaced vertices 246, then less precision is used. If an object is defined with closely spaced vertices 248, then higher precision is used; it is assumed precision is required to ensure (as with small objects) proper rendering of an object's surface. Instead of evaluating all vertices in an object, feature points, e.g., particular coordinates, can be used for density determination. For example, for a cube, inspection of corner vertex spacing can be used to determine precision needed for a face or the entire cube. A related alternative is to use the size of an object to determine precision. As with densely spaced coordinates or feature points, small objects require higher precision values in order to prevent rounding errors from obscuring object details, while large objects do not.

For a given vertex (feature point or otherwise), an evaluation is performed to determine the relative proximity of the given vertex 250, 252, to the other vertices for the object. When feature points are being used, the evaluation is made with respect to other feature points 254. The proximity evaluation is used to determine an additional percentage of reduction for coordinate encoding. Vertex proximity is roughly classified as being near, medium, and far. These classifications correspond to a respective 50%, 55%, and 60% reduction in floating-point precision reduction for coordinate values. (Note that these reduction factors are arbitrary.)

If we assume initial application of the FIG. 5 distance-based precision reduction, and then apply proximity-based reduction, original 32-bit floating-point values are first reduced to 20, 15 and 10 bits, and then further reduced from 20 bits to 10 bits, 15 bits to 8 bits, and 10 bits to 6 bits based on proximity. Thus, a vertex originally requiring 96-bits to represent the X,Y,Z values, now only requires, a maximum of 30 bits, and a minimum of 18 bits. It is understood the precision reduction techniques disclosed herein may be performed in different combinations to reduce coordinate precision requirements.

Additionally, precision determination can be adaptively modified according to dynamic player connection factors, such as network speed, efficiency, or load, and communication speed, latency, etc. Other characteristics of a model and its objects can also be used to determine a required precision for floating point values. However, once a particular precision is determined, floating-point values can be sent from a provider to a recipient as follows.

Figure 7:
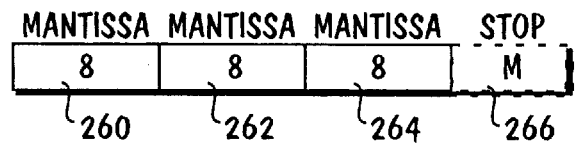
FIG. 7 illustrates one encoding for three spatial coordinates.

FIG. 7, shows a particular method for packing vertex data for delivery to the recipient (e.g., game player). Assume that according to the above described determination processes it is determined that 8-bit precision is sufficient for representing the coordinates of an object with a model. Shown is an encoding of data for a particular vertex's X 260, Y 262, and Z 264 coordinates. Here, only 24 bits are required to encode all three vertices. This is a significant gain over 96 bits required to encode three IEEE-754 32-bit values.

Also shown is an m-bit wide field 266 is used to flag the end of a vertex sequence. The size and necessity of this field will depend on the encoding arrangement utilized by a particular embodiment of the invention (e.g., FIG. 7 does not use a stop field). If the stop field 266 is utilized, it needs to be a certain length of bits and a particular value or one set of values that can be identified as a stop word and not a short floating-point sequence. The length and content of this stop word is encoding-implementation dependent.

Figure 8:
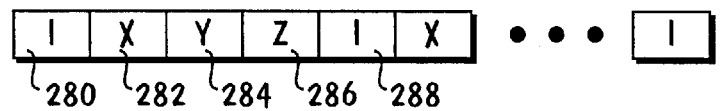
FIG. 8 illustrates an encoding method using encoding-size indicator fields.

FIG. 8 illustrates another method for packaging floating-point values once a particular precision has been determined. Here a stop field is avoided by transmitting an indicator field I 280, 288 that indicates how many bits are going to be used to encode a vertex's X 282, Y 284, and Z 286 components. For example, assume a model designer determines (see, e.g., FIG. 5) each vertex coordinate can be encoded with 10 bit precision, and each I 280, 288 field is 5 bits to allow flagging possible bit lengths of up to the full IEEE-754 standard $2^5$=32 bits (e.g., the floating-point exponent is not being suppressed). In this configuration of 10 bit precision, only 35 bits are required to encode the I-X-Y-Z sequence 280–286 for all three vertices. Note that the second I 288 value may indicate a different precision requirement for subsequent vertices.

Figure 9:
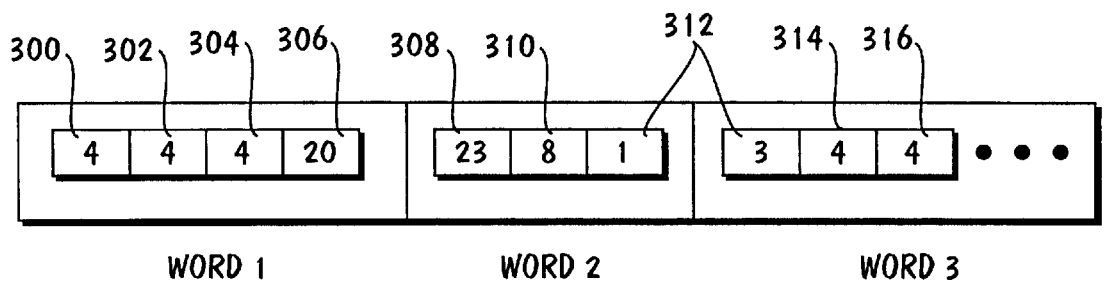
FIG. 9 illustrates a packed-pixel encoding method.

FIG. 9 illustrates another encoding method, in which floating-point values are packed into a 32 bit words. In this configuration, each vertex component (e.g., the X, Y, Z values) can be of arbitrary length. A leading table is used to identify the packing arrangement. Thus, as shown, a trio of 4 bits is used to signal the number of bits in use for the following three vertex values. Note that $2^4$ can only represent 16 values, however a full 24 bit mantissa sequence can be encoded if a minimal length of 8 bits is assumed (this assumes unitary coordinates and an implied floating-point exponent). If a longer table size is used then assuming minimal mantissa lengths may be unnecessary.

As shown, initial entries 300, 302, 304 identify the sizes of vertices X 306, Y 308 and Z 310. As illustrated, X is 20 bits wide, which would correspond to the first field having a value of 12. Since the combination of the three fields and X is 32 bits, these items completely fill up one data word.

Y is 23 bits wide, corresponding to a second field 302 value of 15. Z 310, however, is only 8 bits wide. If one assumes a length of 8 bits, then the third field would be all zeros. Following the Z value is the beginning of the first field for the next trio of vertices. However, since Y 308 and Z 310 are 31 bits in length, only the first bit of the next first field 312 fits into the second data word. The remainder of field 312 is continued in the third data word, and so on.

It will be appreciated that the FIGS. 3, 7–9 embodiments can be altered without loss of generality. Once a determination of floating-point precision is made, whether automatically or by game developer intervention (e.g., setting an expected zoom ratio), IEEE-754 floating point values can be trimmed accordingly.

Figure 10:
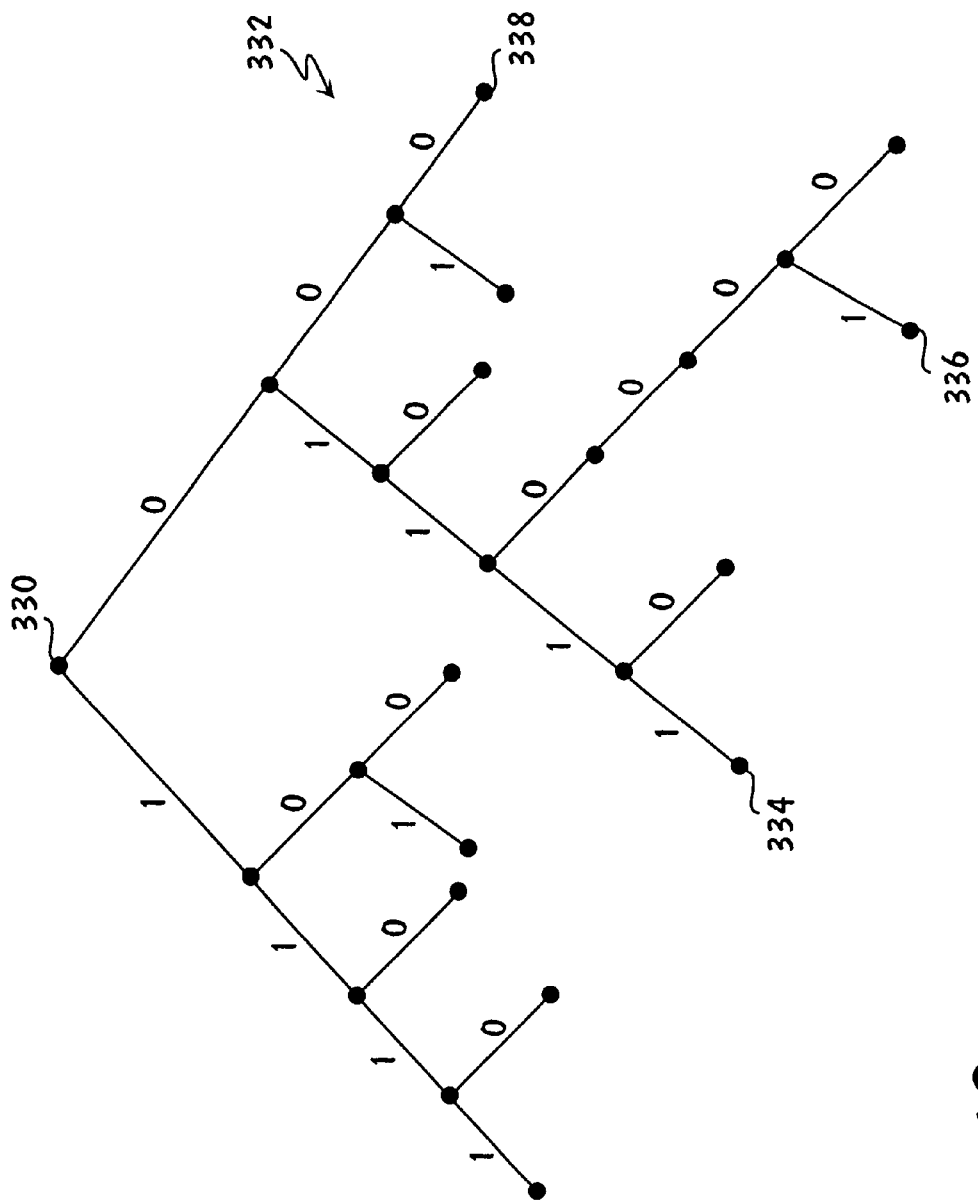
FIG. 10 illustrates a graph-based encoding scheme for floating point numbers.

FIG. 10 illustrates a graph-based encoding scheme for floating point numbers. In this representation, vertices can be encoded with bit-sequences of arbitrary length and transmitted as a single block (or blocks) of bit data. As shown, such a graph has a start node 330, interior nodes 332, and leaf nodes 334, 336 (only representative nodes identified). A recording of a graph traversal from the start node to a particular leaf node corresponds to a particular floating point bit sequence, e.g., a mantissa encoding.

In this configuration, floating point values can be arbitrarily truncated according to where leaf nodes are placed. That is, during encoding of standard floating-point values, the graph can be bit-wise traversed until a leaf node is reached. At such point, a record of the traversal corresponds to the new encoding (e.g., truncated) format for such standard floating-pint value. For example, a leaf node 338 can correspond to a truncated floating point value having mantissa bit sequence 000—the effect is to decide that for a particular model, no floating point value will have three leading zero bits. So, during encoding of a 32-bit binary value 110100100 . . . 001, it would be truncated into a 3-bit value of 110. Similarly, another leaf node 336 would correspond to a longer bit sequence 0110001, providing better precision. Assuming both the provider and recipient have a copy of this graph in local storage, decoding is trivial. For received vertex data, a bit-wise traversal of the graph will properly separate out vertex values. Leaf nodes imply value separation. Additionally, this format offers a modicum of error correction since an inability to consume all bits in an encoding sequence will indicate a transmission error, allowing for error recovery.

Figure 11:
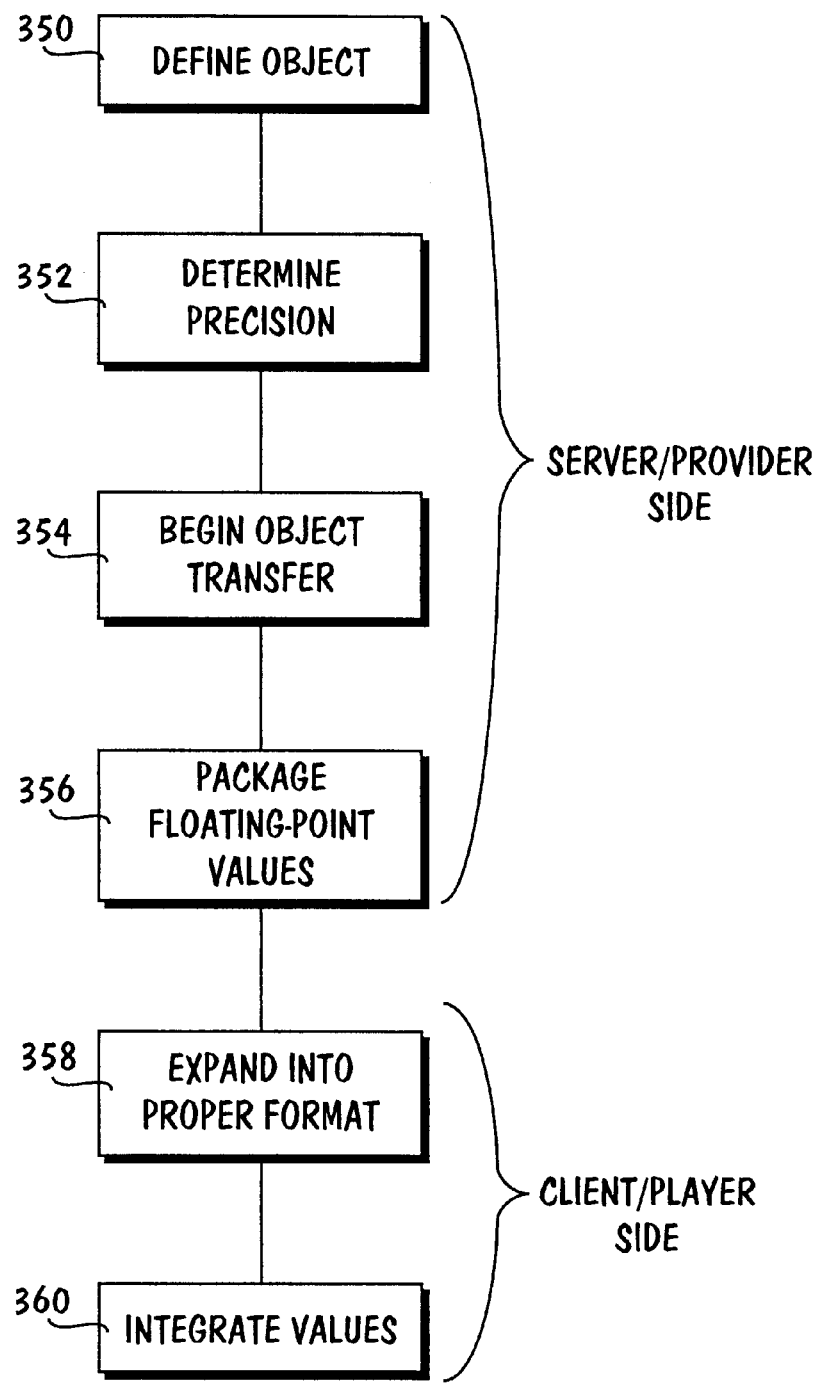
In FIG. 11 is a flowchart for an encoding and decoding process.

FIG. 11 is a flowchart of the encoding and decoding process for truncated floating point values. The context of the flow chart is the creation of a 3D model in which players are to play their game. This chart concerns one particular object within the model.

A first operation 350 is to define the object, where such object is ultimately defined according to plural triangles. The plural triangles are defined according to a set of vertices, which if geometry is being optimized, the vertices are being shared among the different triangles.

A subsequent operation 352 is to determine a floating-point precision for the object. As discussed above, this can be determined according to model developer identified zoom range for the object, or by other methods.

A subsequent operation 354 is to begin transferring an object's encoded data to a recipient. This operation takes place during game play, and at this point, the entire 3D model has previously been created, and statically identifiable precision determinations already defined for all objects. This operation includes, however, adjusting a current precision determination according to dynamic factors discussed above, such as intra-object proximity. On transfer of object data from a content provider 100 to a recipient; e.g., player 1 102, all vertex values are packaged 356 according to one of the methods illustrated above for FIGS. 3, 6–8 and transferred in the form of transmission packets.

On receipt of the compressed vertex data, the player then re-expands 358 the vertex data back into a standard IEEE-754 format. This is performed since today's rendering hardware typically requires the data to be in a standard format. This operation is optional if a chipset for directly processing truncated floating point values as described herein is available.

After re-expansion 358, the object is integrated 360 into local model memory (or other storage) for use during game play. The net effect of the packaging 356 and expansion 358 compression process is to have fully formed floating point values in both the content provider 100 and player 102–108 environments, but where the client-side values have undergone loss of precision, that are insignificant to perceptual effects, to aid in transmission of the values.

Figure 12:
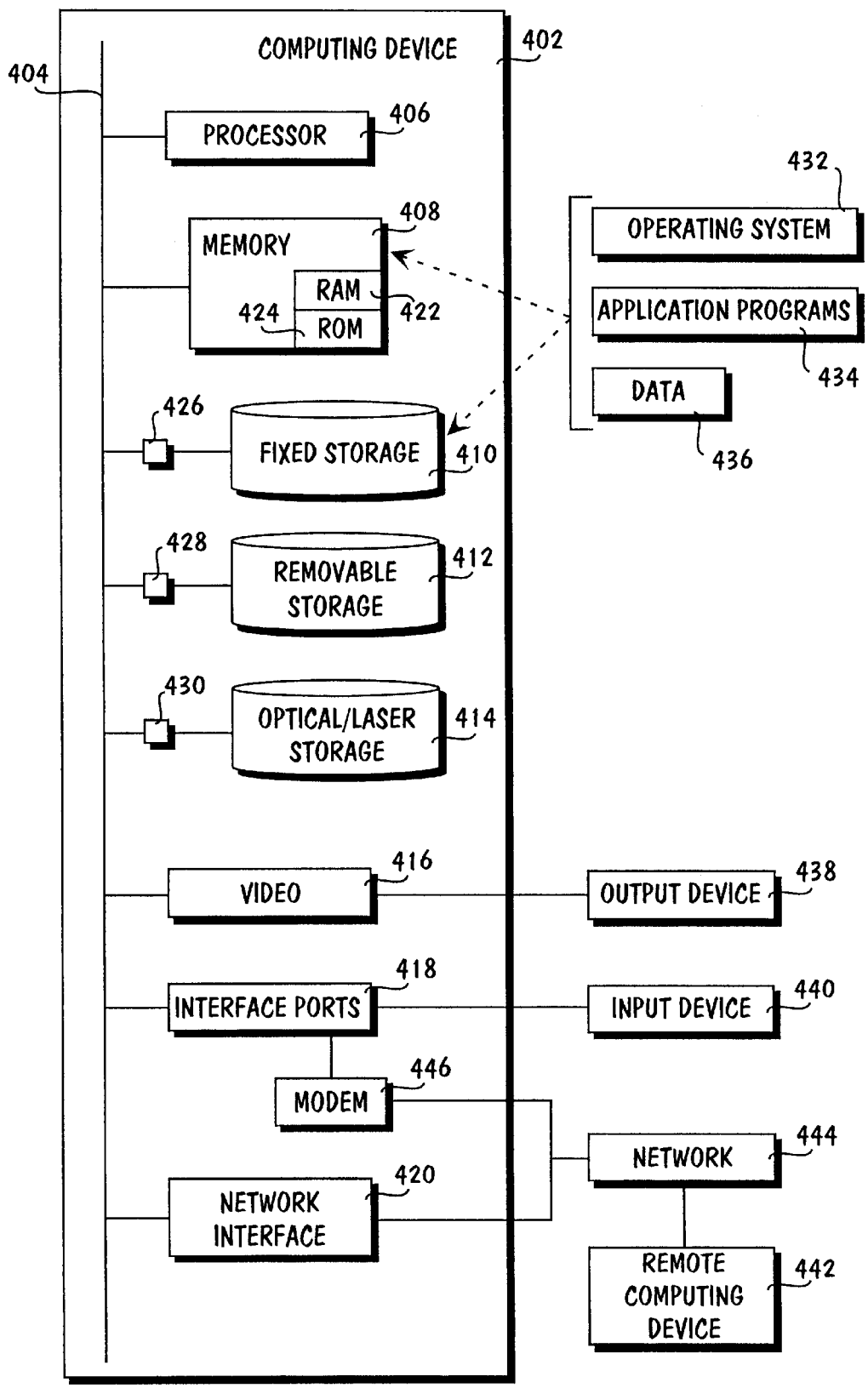
FIG. 12 illustrates a general environment in which the invention or parts thereof may be practiced.

FIG. 12 and the following discussion are intended to provide a brief, general description of a suitable computing environment in which the invention may be implemented. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the invention includes a computing device 402 having system bus 404 for coupling together various components within the computing device. The system 404 bus may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 402 are a processor 406, a memory 408, storage devices (e.g., fixed 410, removable 412, optical/laser 414), a video interface 416, input/output interface ports 418, and a network interface 420.

The processor 406 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 422, and static or re-programmable read only memory (ROM) 424. A basic input/output system (BIOS), stored in ROM, contains routines for information transfer between device 402 components or device initialization.

The fixed storage 410 generally refers to hard drive and other semi-permanently attached media, whereas removable storage 412 generally refers to a device-bay into which removable media such as a floppy diskette is removably inserted. The optical/laser storage 414 include devices based on CD-ROM, DVD, or CD-RW technology, and are usually coupled to the system bus 404 through a device interface 426, 428, 430. The storage systems and associated computer-readable media provide storage of data and executable instructions for the computing device 402. Note that other storage options include magnetic cassettes, tapes, flash memory cards, memory sticks, digital video disks, and the like.

The exemplary computing device 402 can store and execute a number of program modules within the RAM 422, ROM 424, and storage devices 410, 412, 414. Typical program modules include an operating system 432, application programs 434 (e.g., a web browser or network application program), etc., and application data 436. Program module or other system output can be processed by the video system 416 (e.g., a 2D and/or 3D graphics rendering device), which is coupled to the system bus 404 and an output device 438. Typical output devices include monitors, flat-panels displays, liquid-crystal displays, and recording devices such as video-cassette recorders.

A user of the computing device 402 is typically a person interacting with the computing device through manipulation of an input device 440. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 402 is expected to operate in a networked environment using logical connections to one or more remote computing devices. One such remote computing device 442 may be a web server or other program module utilizing a network application protocol (e.g., HTTP, File Transfer Protocol (FTP), Gopher, Wide Area Information Server (WAIS)), a router, a peer device or other common network node, and typically includes many or all of the elements discussed for the computing device 402. The computing device 402 has a network interface 420 (e.g., an Ethernet card) coupled to the system bus 404, to allow communication with the remote device 442. Both the local computing device 402 and the remote computing device 442 can be communicatively coupled to a network 444 such as a WAN, LAN, Gateway, Internet, or other public or private data-pathway. It will be appreciated that other communication links between the computing devices, such as through a modem 446 coupled to an interface port 418, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 406 of electrical signals representing data bits which causes a resulting transformation or reduction of the electrical signal representation, and the maintenance of data bits at memory locations in the memory 408 and storage systems 410, 412, 414, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of the invention with reference to illustrated embodiments, it will be recognized that the illustrated embodiments can be modified in arrangement and detail without departing from such principles.

For example, while the foregoing description focused—for expository convenience—on compressing floating point values for vertices, it will be recognized that the same techniques and analyses can be applied to different numeric values needing transport between a content provider and a player (e.g., for compressing sound effects). Consequently, in view of the wide variety of alternate applications for the invention, the detailed embodiments are intended to be illustrative only, and should not be taken as limiting the scope of the invention. Rather, what is claimed as the invention, is all such modifications as may come within the scope and spirit of the following claims and equivalents thereto.

What is claimed is:

1. A method for reducing data space consumption of a first object representation of an object in a model comprising:
    determining a bounding box for said object;
    determining a distance between said bounding box and a model origin;
    selecting a scaling factor for said first object representation based at least in part on said determined distance;
    compressing said first object representation according to said selected scaling factor by mapping each data of said first object representation to data of a second object representation, said second object representation have a smaller data space consumption than said first object representation.

2. The method of claim 1 further comprising receiving said distance as an input parameter.

3. The method of claim 1 wherein said selecting of said scaling factor is further based on a size of said bounding box.

4. The method of claim 1 wherein said first object representation comprises a plurality of object features.

5. The method of claim 4 wherein said plurality of object features comprise triangles.

6. The method of claim 4 further comprising:
    determining a proximity value between a first and a second object feature;
    wherein said selecting of said scaling factor is further based on said proximity value.

7. The method of claim 4 further comprising:
    determining a proximity value for a first object feature based on its spatial distance from plural other object features;
    wherein said selecting of said scaling factor is further based on said proximity value.

8. The method of claim 4 wherein each feature has a spatial position represented at least in part by a standard-format floating point number, the method further comprising:
    converting said standard-format floating point number into a nonstandard-format floating point number having an n-bit length mantissa;
    wherein all spatial positions are represented by unitary coordinate values between zero and one.

9. An apparatus comprising:
    a storage medium having stored therein a plurality of programming instructions for reducing data space consumption of a first object representation of an object in a model, wherein said programming instructions are designed to:
        determine a bounding box for said object;
        determine a distance between said bounding box and a model origin;
        select a scaling factor for said first object representation based at least in part on said determined distance; and
        compress said first object representation according to said selected scaling factor by mapping each data of said first object representation to data of a second object representation, said second object representation have a smaller data space consumption than said first object representation; and
    a processor coupled to said storage medium to execute said programming instructions.

10. The apparatus of claim 9 wherein said programming instructions are further designed to receive said distance as an input parameter.

11. The apparatus of claim 9 wherein said selecting of said scaling factor is further based on a size of said bounding box.

12. The apparatus of claim 9 wherein said first object representation comprises a plurality of object features.

13. The apparatus of claim 12 wherein said plurality of object features comprise triangles.

14. The apparatus of claim 12 wherein said programming instructions are further designed to:
    determine a proximity value between a first and a second object feature;
    wherein said selecting of said scaling factor is further based on said proximity value.

15. The apparatus of claim 12 wherein said programming instructions are further designed to:
- determine a proximity value for a first object feature based on its spatial distance from plural other object features;
- wherein said selecting of said scaling factor is further based on said proximity value.

16. The apparatus of claim 12 wherein each feature has a spatial position represented at least in part by a standard-format floating point number and wherein said programming instructions are further designed to:
- convert said standard-format floating point number into a nonstandard-format floating point number having an n-bit length mantissa;
- wherein all spatial positions are represented by unitary coordinate values between zero and one.

* * * * *

UNITED STATES PATENT AND TRADEMARK OFFICE
CERTIFICATE OF CORRECTION

PATENT NO. : 6,697,530 B2
DATED : February 24, 2004
INVENTOR(S) : Kenyon et al.

It is certified that error appears in the above-identified patent and that said Letters Patent is hereby corrected as shown below:

Title page,
Item [56], References Cited, U.S. PATENT DOCUMENTS, "6,282,540 B1 * Goldensher et al. ….. 70/6" should read -- 6,282,540 B1 * Goldensher et al. …. 707/6 --.
Item [57], ABSTRACT,
Line 5, "video conferencing" should read -- videoconferencing --.
Line 6, "multi-media" should read -- multimedia --.

Column 1,
Line 14, "video conferencing" should read -- videoconferencing --.
Line 31, "two and three-dimensional" should read -- two- and three-dimensional --.

Column 2,
Line 2, "KBits per second" should read -- K-bits per second --.

Column 3,
Line 17, "numbers. In" should read -- numbers. --.

Column 6,
Line 6, "truncated figureas" should read -- truncated figures --.
Line 58, "beyond-which" should read -- beyond which --.

Column 7,
Lines 3-4, "20, 15 and 10-bit" should read -- 20, 15, and 10-bit --.
Line 54, "FIG. 7, shows" should read -- FIG. 7 shows --.

Signed and Sealed this

Twenty-first Day of June, 2005

JON W. DUDAS
*Director of the United States Patent and Trademark Office*